US012117771B2

(12) United States Patent
Macé et al.

(10) Patent No.: US 12,117,771 B2
(45) Date of Patent: Oct. 15, 2024

(54) NATURAL ESCAPEMENT FOR A HOROLOGICAL MOVEMENT AND HOROLOGICAL MOVEMENT COMPRISING SUCH AN ESCAPEMENT

(71) Applicant: Montres Breguet S.A., L'Abbaye (CH)

(72) Inventors: Jérôme Macé, Le Pont (CH); Alain Zaugg, Le Sentier (CH); Quentin Theurillat-Bonjour, Vallorbe (CH)

(73) Assignee: Montres Breguet S.A., L'Abbaye (CH)

( * ) Notice: Subject to any disclaimer, the term of this patent is extended or adjusted under 35 U.S.C. 154(b) by 388 days.

(21) Appl. No.: 17/585,839

(22) Filed: Jan. 27, 2022

(65) Prior Publication Data

US 2022/0404771 A1 Dec. 22, 2022

(30) Foreign Application Priority Data

Jun. 17, 2021 (EP) .................................... 21180088

(51) Int. Cl.
*G04B 15/08* (2006.01)
*G04B 15/14* (2006.01)

(52) U.S. Cl.
CPC ............. *G04B 15/08* (2013.01); *G04B 15/14* (2013.01)

(58) Field of Classification Search
CPC ........ G04B 15/08; G04B 15/14; G04B 13/00; G04B 15/10; G04B 15/06
See application file for complete search history.

(56) References Cited

U.S. PATENT DOCUMENTS 3,704,582 A * 12/1972 Wuthrich ............... G04B 15/14 968/102
4,122,665 A * 10/1978 Giger ..................... G04B 15/14 968/102

(Continued)

FOREIGN PATENT DOCUMENTS

CH 701 921 A2 4/2011
CH 713 531 A2 9/2018

(Continued)

OTHER PUBLICATIONS

European Search Report issued Nov. 4, 2021 in European Application 21180088.3, filed on Jun. 17, 2021, 3 pages (with English Translation of Categories of cited documents).

(Continued)

*Primary Examiner* — Edwin A. Leon
(74) *Attorney, Agent, or Firm* — Oblon, McClelland, Maier & Neustadt, L.L.P.

(57) ABSTRACT

A natural escapement for a horological movement performing a succession of operating cycles each composed of a first and a second alternation of a balance which includes a balance wheel on an axis of which is adjusted a balance plate, this natural escapement including a first escapement wheel arranged to be driven by a second wheel, this first escapement wheel in turn driving a second escapement wheel, the balance plate carrying a balance pin wherein this balance plate causes the pivoting of an anchor at each of the first and second alternations, a first lever, pivoted about a pivot axis, being connected to a first arm of the anchor via at least one pivot joint, the anchor including a second arm extended by a second lever, these levers being arranged to respectively lock the first and second escapement wheels temporarily.

29 Claims, 11 Drawing Sheets

(56) References Cited

U.S. PATENT DOCUMENTS

| | | | | |
|---|---|---|---|---|
| 6,942,378 | B2 * | 9/2005 | Hayek .................... | G04B 15/06<br>368/127 |
| 2002/0088295 | A1 | 7/2002 | Oechslin | |
| 2008/0219104 | A1 * | 9/2008 | Jurin ...................... | G04B 15/06<br>368/132 |
| 2012/0207000 | A1 | 8/2012 | Journe | |

FOREIGN PATENT DOCUMENTS

| | | | |
|---|---|---|---|
| CH | 714 200 | A1 | 3/2019 |
| CN | 104898396 | A | 9/2015 |
| CN | 104898397 | A | 9/2015 |
| CN | 108572538 | A | 9/2018 |
| DE | 2458503 | A1 | 6/1976 |
| EP | 2 487 546 | A1 | 8/2012 |

OTHER PUBLICATIONS

Combined Chinese Office Action and Search Report issued on Jul. 4, 2023 in Chinese Patent Application No. 202210304550.7 (with English translation of Office Action only), 8 pages.

* cited by examiner

NATURAL ESCAPEMENT FOR A HOROLOGICAL MOVEMENT AND HOROLOGICAL MOVEMENT COMPRISING SUCH AN ESCAPEMENT

CROSS-REFERENCE TO RELATED APPLICATION

This application claims priority to European Patent Application No. 21180088.3 filed on Jun. 17, 2021, the entire disclosure of which is hereby incorporated herein by reference.

TECHNICAL FIELD OF THE INVENTION

The present invention relates to a natural escapement for a horological movement also known by its name tangential impulse escapement. The present invention also relates to a horological movement comprising such an escapement.

TECHNOLOGICAL BACKGROUND

The principle of the natural escapement was devised by Abraham Louis Breguet in the early 19th century. The advantage of the Breguet natural escapement is in particular that it is a free escapement in so far as the balance is only disturbed by the operation of the escapement over a small fraction of its oscillation. The advantage of the Breguet natural escapement is also that it gives each alternation an impulse which is direct and tangential to the balance. In other words, energy is transferred directly from the escapement wheel to the balance, without going through an anchor. Moreover, the energy is transmitted only tangentially, so that the frictions generated by the operation of this escapement are limited. Unlike the balance of a detent escapement, the balance of a natural escapement does not have a coup perdu; it receives a similar impulse with each alternation, in a symmetrical and more uniform manner, so that the losses of mechanical energy per coup perdu are suppressed. All these qualities make the natural escapement potentially one of the most efficient.

Breguet nevertheless subsequently discovered that the natural escapement he had imagined had certain disadvantages, foremost among which mention may be made of the fact that the last escapement wheel is not under the tension of the geartrain when the first wheel provides the impulse or when the latter is at rest. The various plays in the geartrains and the quality of manufacture of the various components used in the composition of a Breguet natural escapement can thus cause incorrect positioning of the last escapement wheel and, consequently, a malfunction of the escapement accompanied with parasitic noises. Furthermore, since the escapement wheel is free, its position is unstable, so that the operational safety of such a natural escapement is poor.

Of course, many improvements have been made to the original Breguet natural escapement in an attempt to overcome the disadvantages mentioned above. Nevertheless, despite the efforts of successive watch manufacturers, difficulties remain. Some watchmakers have thus proposed to superimpose the two escapement wheels, a solution which, of course, increases the thickness of the movement and makes it difficult to integrate such a movement into a watch case. Other watch manufacturers have, in turn, proposed positioning the anchor between the two escapement wheels, in the plane of the latter. Here too, such a solution is bulky, this time in the plane of the movement. In addition, whether the escapement wheels are superimposed or the anchor is disposed between the two escapement wheels, it has been realised in practice that watchmakers have difficulty in accessing the various components of the escapement, in particular when it comes to adjusting the depth of penetration of the teeth of the first and second escapement wheels with the exit and entry pallets of the anchor.

SUMMARY OF THE INVENTION

The purpose of the present invention is to overcome the problems mentioned above as well as others by providing a natural escapement for a horological movement, the operation of which can in particular be adjusted more precisely.

To this end, the present invention relates to a natural escapement for a horological movement performing a succession of operating cycles each composed of a first and a second alternation of a balance which comprises a balance wheel on an axis of which is adjusted a balance plate, this natural escapement comprising a first escapement wheel arranged to be driven by a second wheel, this first escapement wheel in turn driving a second escapement wheel, the balance plate carrying a balance pin by which this balance plate causes the pivoting of an anchor at each of the first and second alternations, at least a first lever, pivoted about a pivot axis, being connected to a first arm of the anchor via at least one pivot joint, the anchor comprising a second arm extended by a second lever, these first and second levers being arranged to respectively lock the first and second escapement wheels temporarily during the second and first alternations of an operating cycle, the pivoting displacement of the first and second levers being limited.

According to special embodiments of the invention:

- the first and second levers are pivoted about respective pivot axes and are respectively connected to the first and second arms of the anchor via at least one pivot joint;
- the pivot joints are each formed of a bulge which projects into an oblong opening;
- the pivot joints are each formed of a lug which is engaged into a fork;
- the pivot joints are each formed of a flexible blade;
- the first and second limitation abutments are pegs;
- the first and second abutments are machined in a fixed element of the horological movement;
- the first and second limitation abutments are eccentrics;
- the first lever is made in one piece and has a geometry which performs the function of a first stop pallet to temporarily lock the first escapement wheel during the second alternation, and the second lever is made in one piece and has a geometry which performs the function of a second stop pallet to temporarily lock the second escapement wheel during the first alternation;
- the first lever comprises a first stop pallet to temporarily lock the first escapement wheel during the second alternation, and the second lever includes a second stop pallet to temporarily lock the second escapement wheel during the first alternation;
- the balance plate carries a first and a second impulse pallet through which this balance plate receives a direct and tangential driving impulse respectively from the first escapement wheel and the second escapement wheel;
- the first escapement wheel comprises a drive toothing and an impulse and rest toothing which extend in a single plane or in two parallel planes and through which this first escapement wheel meshes with the second escapement wheel and provides the direct and tangential driving impulse to the balance plate;

the second escapement wheel comprises a drive toothing and an impulse and rest toothing which extend in a single plane or in two parallel planes and through which this second escapement wheel meshes with the first escapement wheel and provides the direct and tangential driving impulse to the balance plate;

the number of teeth of the impulse and rest toothing of the first and second escapement wheels is comprised between 3 and 14;

the number of teeth of the impulse and rest toothing of the first and second escapement wheels is equal to 10;

the number of teeth of the impulse and rest toothing of the first escapement wheel is different from the number of teeth of the impulse and rest toothing of the second escapement wheel;

the number of teeth of the impulse and rest toothing of the first escapement wheel is equal to 3, and the number of teeth of the impulse and rest toothing of the second escapement wheel is equal to 10;

the number of teeth of the impulse and rest toothing of the first escapement wheel is equal to 10, and the number of teeth of the impulse and rest toothing of the second escapement wheel is equal to 3;

the anchor comprises a fork formed of a first and a second horn, the balance plate abutting by its balance pin against the second horn of the fork and causing the pivoting of this anchor in a first direction during the first alternation, and against the first horn during the second alternation, causing the anchor to pivot in a second direction opposite to the first direction;

the fork carries a dart which cooperates with the balance plate to prevent accidental displacements of the fork during a period called additional arc;

the first and second escapement wheels are each made in one piece and each comprise a single level of toothing;

a reduction mobile is disposed between the second wheel and the first escapement wheel.

The invention also relates to a horological movement comprising a natural escapement of the type described above.

Thanks to these features, the present invention provides a natural escapement wherein it is possible, depending on the dimensions of the various lever arms/leverage between the arms of the anchor and the levers, to very precisely adjust the different phases of operation of this natural escapement, namely the triggering and stopping sequences of the first and second escapement wheels, the impulse sequences given by the first and second escapement wheels to the balance plate, as well as the speeds at which the first and second escapement wheels are released from the first and second levers. The precise adjustment of the operation of the natural escapement according to the invention is also permitted in the case where the limitation abutments which limit the displacement of the first and second pivoting levers are eccentrics. Likewise, the fine adjustment of the operation of the natural escapement is also made possible by the fact that the first lever is separated from the second lever, so that the operating phases of the first escapement wheel can be set up and adjusted independently of the operating phases of the second escapement wheel, so that, if necessary, an asymmetrical operation of the natural escapement according to the invention can be obtained. Located outside the volume of the first and second escapement wheels, the anchor is easier to make and much less bulky, so that it is easier to be housed in a horological movement than when it is placed between the two escapement wheels. The natural escapement according to the invention also offers easier access to watchmakers and allows them to make more convenient measurements and adjustments. Moreover, in the case where the first and second escapement wheels are each made in one piece and each comprise a single level of toothing, these first and second escapement wheels are not active in two distinct staged levels and are therefore less bulky and easier to be machined. In addition, the necessary indexing of the teeth used to transmit driving impulses to the balance plate when using two superimposed escapement wheels is avoided. Indeed, in the case of the invention, the indexing of the single toothing of the first and second escapement wheels which ensures both the engagement of these two drive wheels with one another and the transmission of the driving impulses to the balance plate results from the very shape of this toothing.

BRIEF DESCRIPTION OF THE FIGURES

Other features and advantages of the present invention will emerge more clearly from the following detailed description of an embodiment of a natural escapement according to the invention, this example being given in a purely illustrative and non-limiting manner only in conjunction with the appended drawing wherein.

DETAILED DESCRIPTION OF THE INVENTION

The present invention proceeds from the general inventive idea which consists in providing at least one of the arms of the anchor of a natural escapement, also known by its name tangential impulse escapement, with a lever pivoted around a pivot axis and connected to the arm of the anchor via at least one pivot joint. Thanks to this feature, it is possible, by adjusting the lever arm/leverage between the arm of the anchor and the lever which is connected to this arm, to very finely adjust the different operating phases of the natural escapement according to the invention. Likewise, since the first and second escapement wheels are only active on a single level, they are thinner and therefore less bulky and easier to be machined. Furthermore, the indexing of their impulse teeth results from the very shape of their toothing and not from a tedious assembly of two superimposed escapement wheels.

Figure 1:
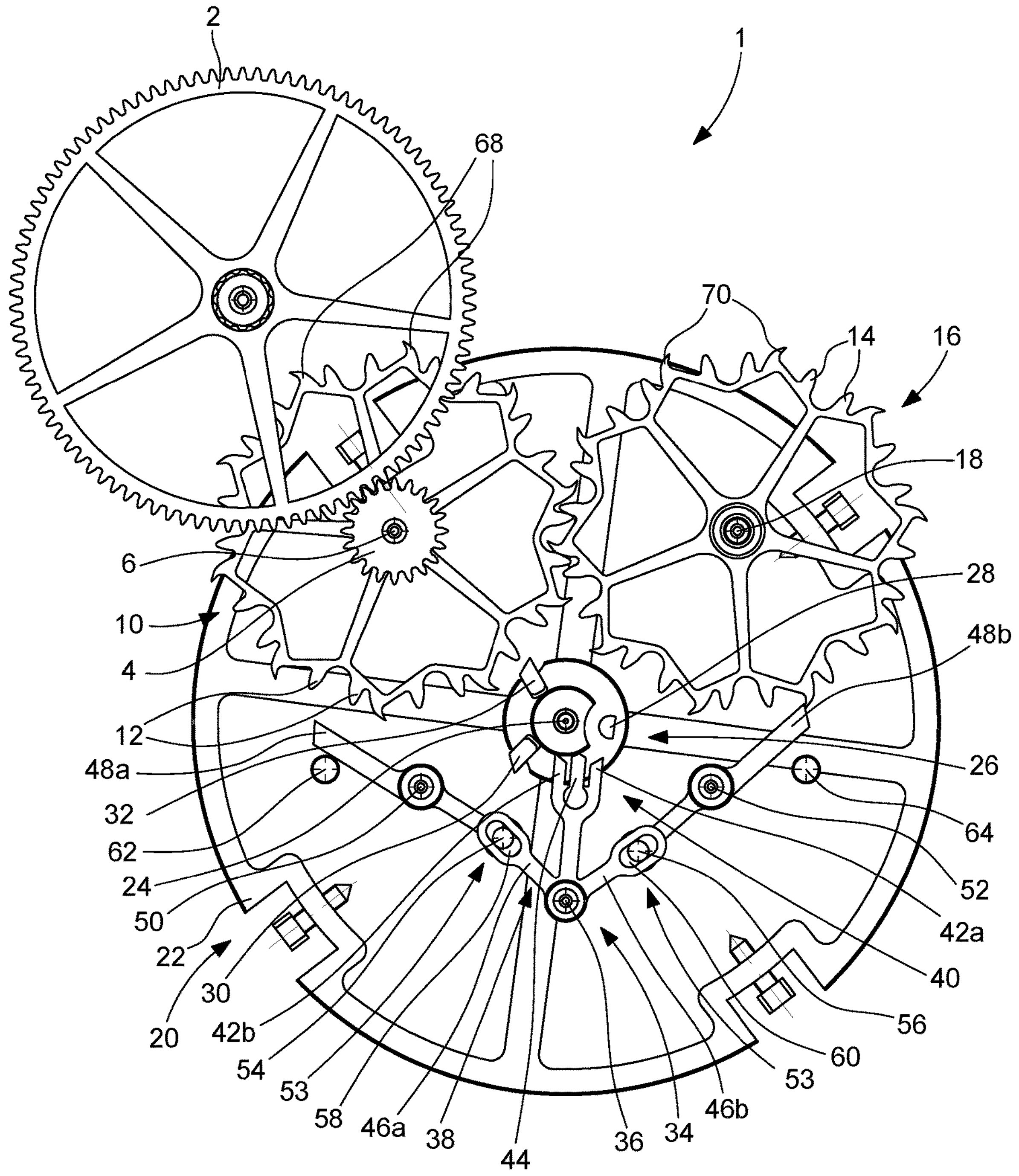
FIG. 1 is a top overview of the natural escapement according to the invention in its rest position wherein the second escapement wheel bears on the second lever.

Designated as a whole by the general reference numeral 1, the natural escapement according to the invention is shown in its rest position in FIG. 1. This natural escapement 1 is arranged to be driven by a second wheel 2 which, according to a preferred but non-limiting embodiment, meshes with a pinion 4 mounted fixedly on an axis 6 of a first escapement wheel 10. This first escapement wheel 10 in turn meshes via a first drive toothing 12 with a second drive toothing 14 of a second escapement wheel 16 which pivots about an axis 18.

The natural escapement 1 also comprises a balance 20 which includes a balance wheel 22 on an axis 24 of which is adjusted a balance plate 26. This balance plate 26 carries a balance pin 28 as well as a first and second impulse pallet 30 and 32, the respective roles of which will be described below.

The natural escapement 1 according to the invention also comprises an anchor 34 pivoted around an anchor rod 36. This anchor 34 includes an anchor body 38 which carries a fork 40 formed of a first and a second horn 42*a* and 42*b* as well as a dart 44. This dart 44 cooperates with the balance plate 26 in order to prevent accidental displacements of the fork 40 outside the periods commonly called additional arcs, periods during which the balance plate 26 is close to its median rest position called the angle of lift.

In accordance with the invention and as can be seen upon examining FIG. 1, the anchor body 38 includes a first and a second arm 46*a* and 46*b* which are preferably but in a non-limiting manner disposed symmetrically on either side of the fork 40. First and second levers 48*a*, 48*b*, pivoted about respective pivot axes 50 and 52, are connected to the first and second arms 46*a*, 46*b* of the anchor body 38 via a pivot joint 53. In this simplified embodiment of the invention, the first lever 48*a* is made in one piece and has a geometry which performs the function of a first stop pallet to temporarily lock the first escapement wheel 10 during an operating cycle of the natural escapement 1, and the second lever 48*b* has a geometry which performs the function of a second stop pallet to temporarily lock the second escapement wheel 16 during the same operating cycle of the natural escapement 1.

According to a first embodiment of the invention, the first and second levers 48*a*, 48*b* each carry a lug 54, respectively 56, which projects into an oblong opening 58, respectively 60, formed in the first and second arm 46*a*, 46*b* of the anchor body 38. Of course, the lugs 54 and 56 could be carried by the first and second arms 46*a*, 46*b*, and the oblong openings 58, 60 could be made in the first and second levers 48*a*, 48*b*. Thus, by engaging the lugs 54, 56 in the oblong openings 58, 60, the first and second levers 48*a*, 48*b* are able to pivot relative to the first and second arms 46*a*, 46*b* of the anchor body 38.

Figure 8:
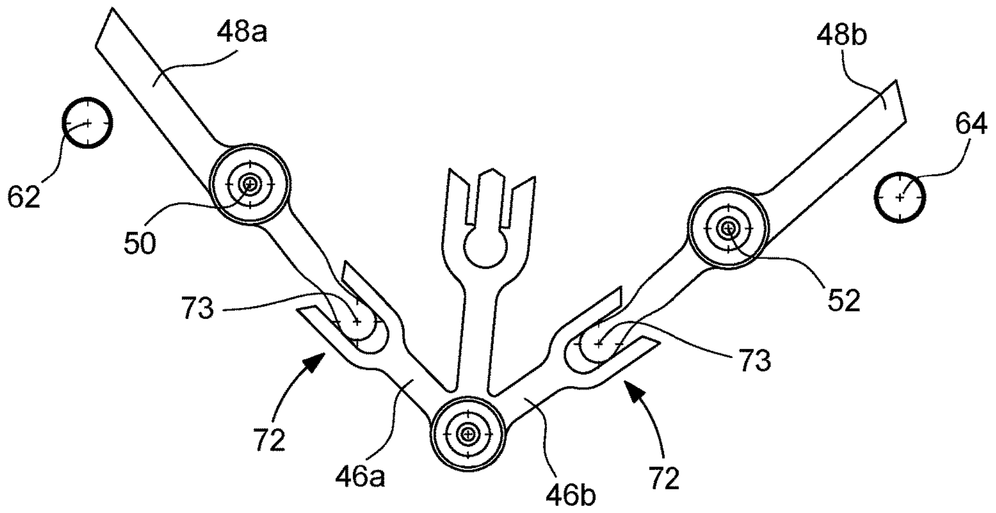
FIG. 8 is a top view which schematically illustrates the case where the pivot joints by which the levers are connected to the arms of the anchor are each formed of a bulge which is engaged into a fork.

According to another embodiment of the invention illustrated in FIG. 8, the oblong openings 58, 60 can be replaced by forks 72 into which the bulges 73 provided at the ends facing the first and second levers 48*a*, 48*b* are engaged.

Figure 9:
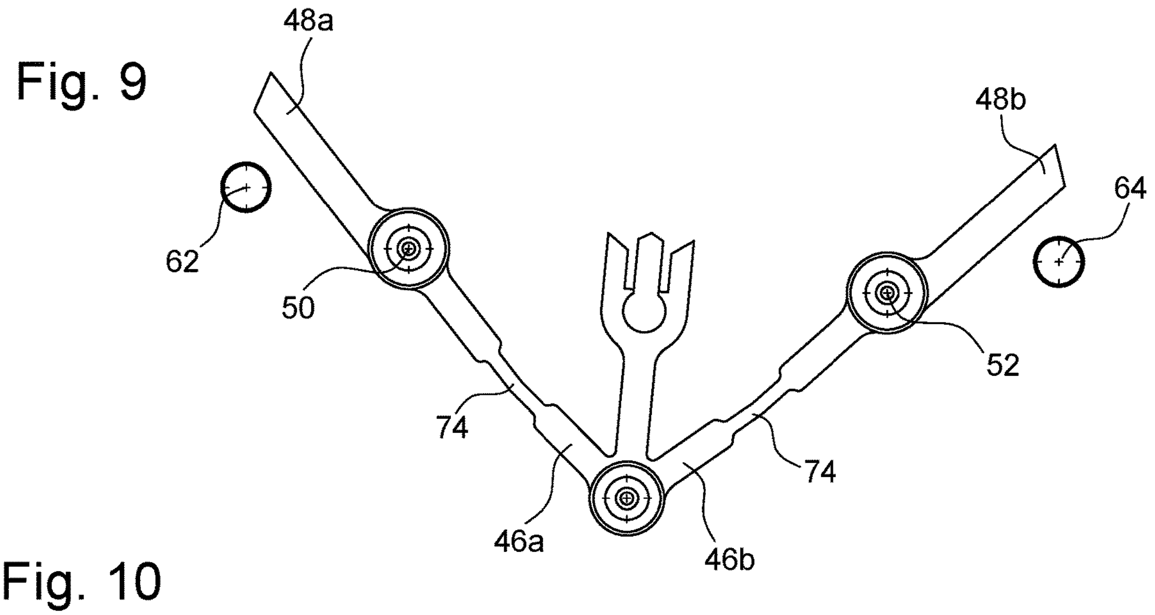
FIG. 9 is a top view which schematically illustrates the case where the levers are connected to the arms of the anchor by means of flexible blades.

According to yet another embodiment of the invention illustrated in FIG. 9, the first and second levers 48*a*, 48*b* are connected to the first and second arms 46*a*, 46*b* of the anchor body 38 by means of flexible blades 74. This embodiment allows to make the anchor body 38 and the first and second levers 48*a*, 48*b* in one piece.

Figure 10:
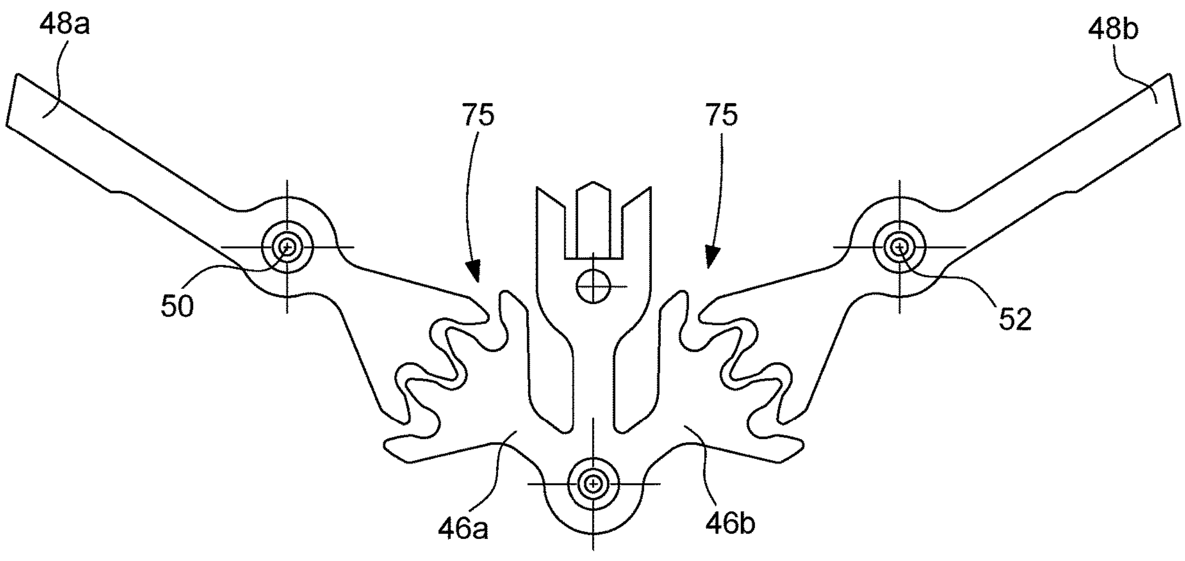
FIG. 10 is a top view which schematically illustrates the case where the pivot joints by which the levers are connected to the arms of the anchor are each formed of 2 rack-type geartrain portions.

According to yet another embodiment of the invention illustrated in FIG. 10, the pivot joints 53 by which the first and second levers 48*a*, 48*b* are connected to the first and second arms 46*a*, 46*b* of the anchor body 38 are each formed of two geartrain portions each of which constitutes a rack 75.

Finally, the natural escapement 1 is completed by a first and a second limitation abutment 62 and 64 of the peg type which limit the pivoting displacement of the first and second levers 48*a*, 48*b*.

In the embodiment of the natural escapement 1 according to the invention illustrated in the drawing, it is assumed that the second wheel 2 which supplies the natural escapement 1 with the energy necessary for its operation rotates in the clockwise direction. The second wheel 2 consequently tends to rotate the pinion 4 and the first escapement wheel 10 on the axis 6 of which is fixed the pinion 4 in the counter-clockwise direction, and the second escapement wheel 16 in the clockwise direction.

An operating cycle of the natural escapement 1 according to the invention comprises two alternations during which the balance plate 26 will go successively from a first extreme position to a second extreme position passing through a median rest position, then from its second extreme position to its first extreme position, passing again through its median rest position. Thus, at the start of a cycle (see FIG. 1), the balance plate 26 rotates towards its median rest position by rotating in the clockwise direction, while the second escapement wheel 16 is bearing on the second lever 48*b*.

Figure 2:
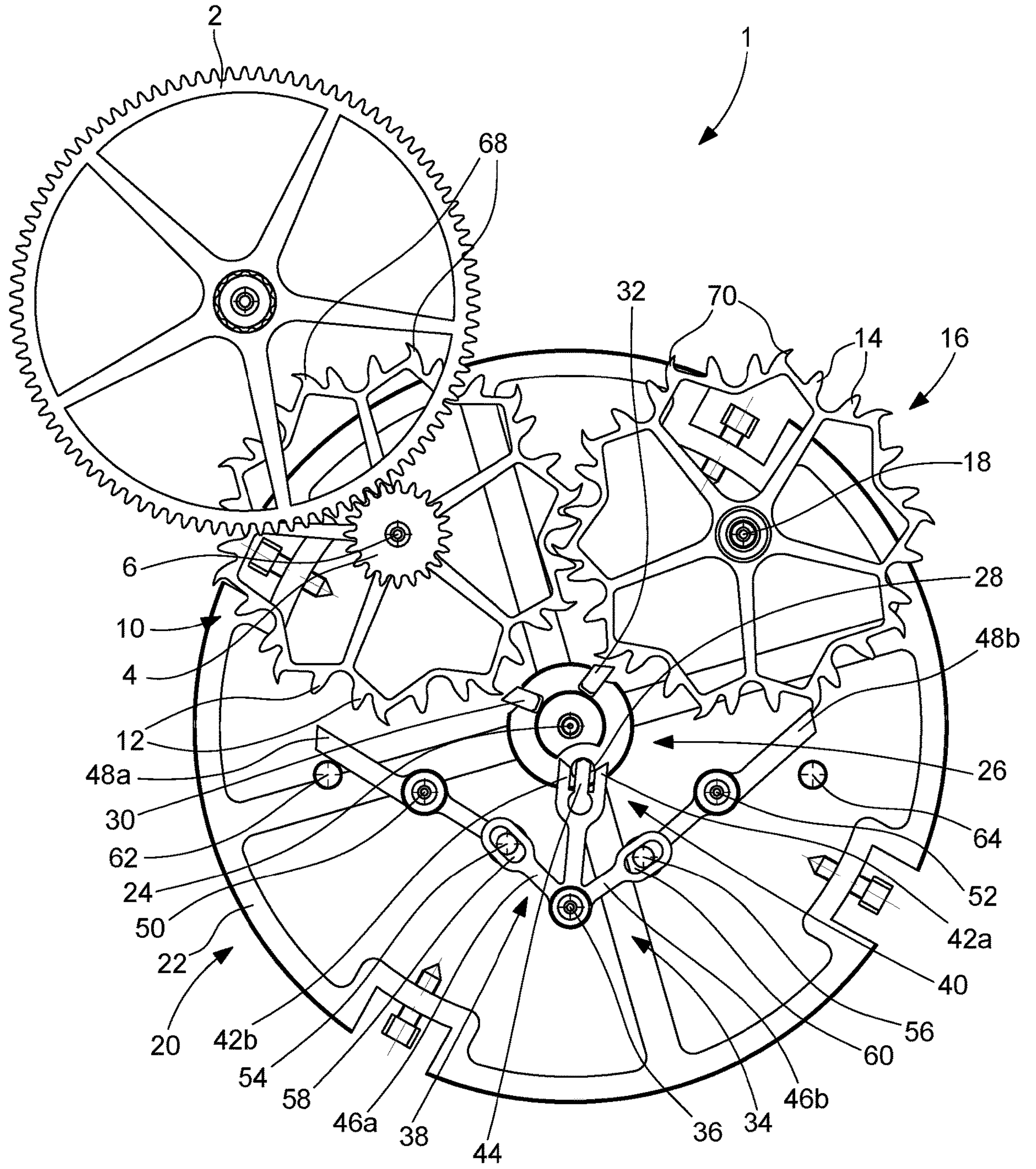
FIG. 2 is a top view of the natural escapement according to the invention in its position wherein the balance pin contacts the second horn of the fork, which will cause the start of the release of the second escapement wheel from its engagement with the second lever.

At a given moment of its displacement illustrated in FIG. 2, the balance plate 26 reaches a position wherein it abuts by its balance pin 28 against the second horn 42*b* of the fork 40 and begins to cause the anchor 34 to pivot in the counter-clockwise direction. The pivoting of the anchor 34 in the counter-clockwise direction has the effect of starting to release the second escapement wheel 16 from its engagement with the second lever 48*b*, which will allow the second wheel 2 to drive, via the first escapement wheel 10, the second escapement wheel 16 in the clockwise direction.

Figure 3:
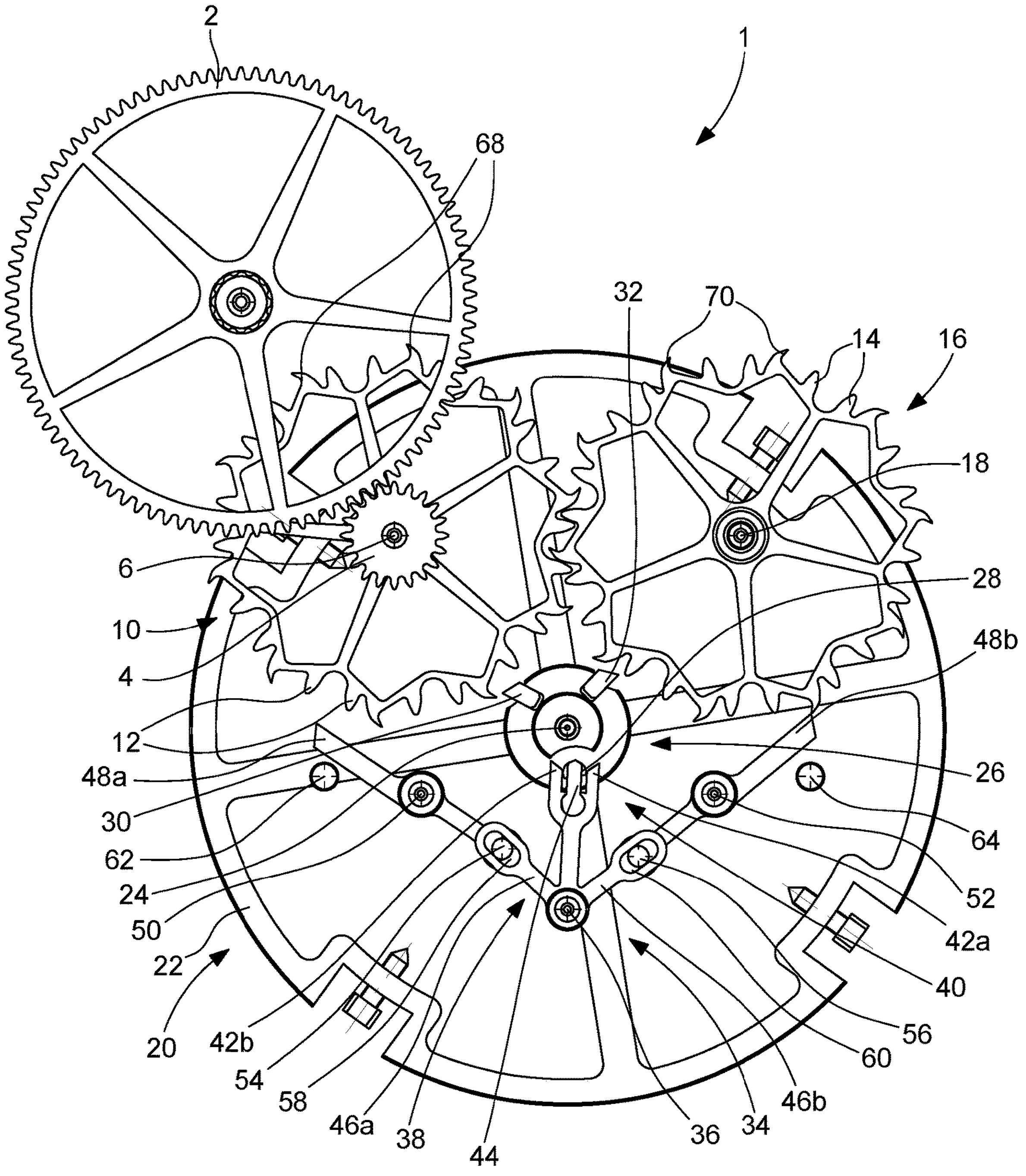
FIG. 3 is a top view of the natural escapement according to the invention in its position wherein the balance plate drives the anchor and the levers, which causes the start of the first drop by releasing the second escapement wheel from its engagement with the second lever.

In FIG. 3, the natural escapement 1 is in a position wherein the balance plate 26 drives the anchor 34, which causes the start of the first drop by releasing the second escapement wheel 16 from its engagement with the second lever 48*b*. "Drop" means the periods of operation of the natural escapement 1 according to the invention during which the first and second escapement wheels 10 and 16 are not in contact with either of the first and second levers 48*a*, 48*b*, nor with either of the first and second impulse pallets 30, 32.

Figure 4:
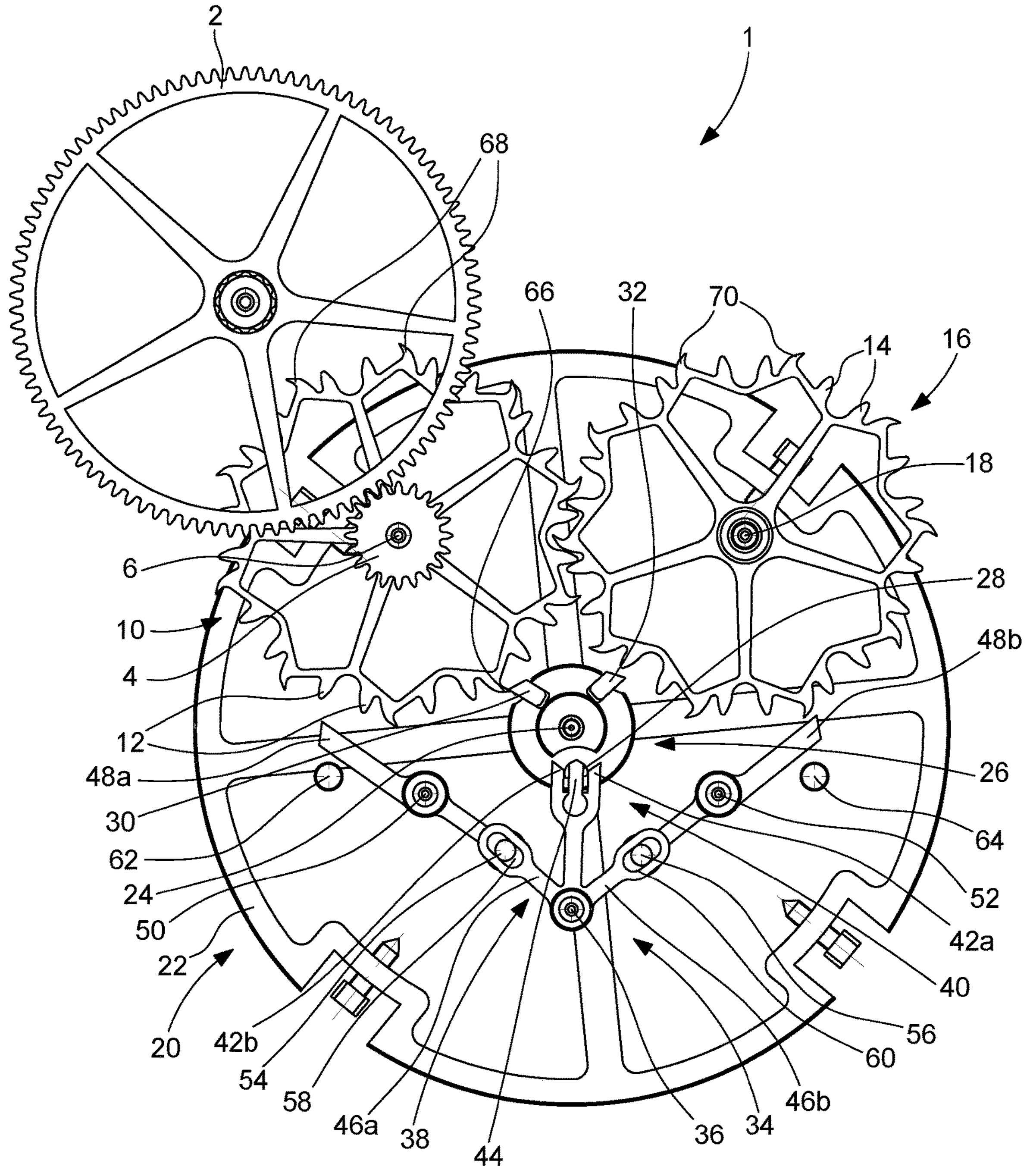
FIG. 4 is a top view of the natural escapement according to the invention in its position wherein the first escapement wheel bears on the first impulse pallet and begins to give impulse to the balance plate, which marks the end of the first drop.

It will be understood that at the same time as the first escapement wheel 10 drives the second escapement wheel 16 in clockwise pivoting, the first escapement wheel 10 also begins to give a driving impulse to the balance plate 26 via a tooth 66 of an impulse and rest toothing 68 which drives the first impulse pallet 30 (see FIG. 4). This driving impulse is called direct and tangential because it is given directly by the first escapement wheel 10 to the balance plate 26 and the path of the tooth 66 tangentially catches that of the first impulse pallet 30 of the balance plate 26, which allows an almost punctual contact and without friction. It should moreover be noted that the contact of the tooth 66 of the first escapement wheel 10 with the first impulse pallet 30 of the balance plate 26 marks the end of the first drop.

Figure 5:
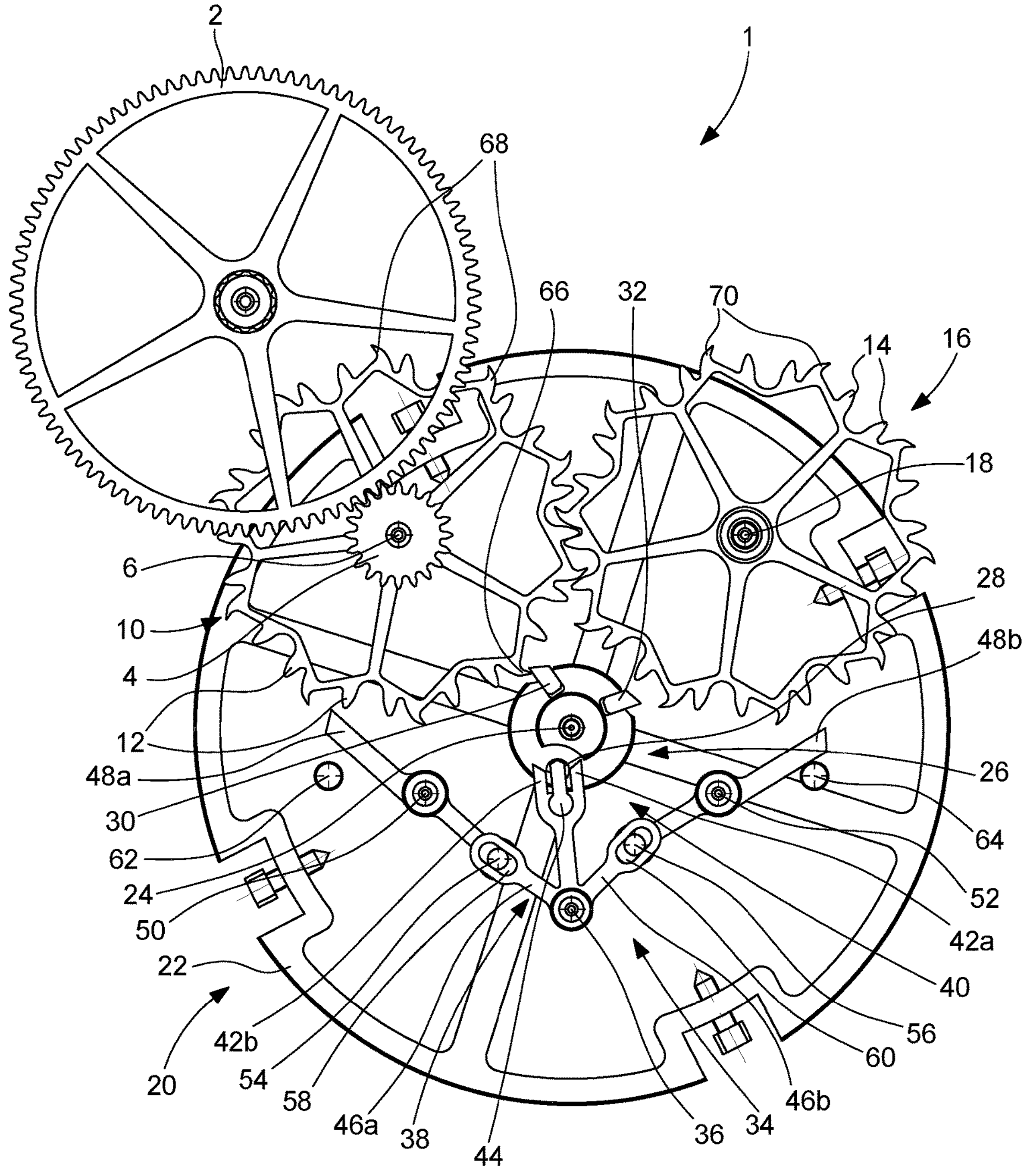
FIG. 5 is a top view of the natural escapement according to the invention in its position wherein the first escapement wheel imparts the impulse to the balance plate while the second lever bears against the second limitation abutment.

FIG. 5 is a top view of the natural escapement 1 according to the invention in its position wherein the first escapement wheel 10 imparts the impulse to the balance plate 26, while the second lever 48*b* pivots around its pivot axis 52 and bears against the second limitation abutment 64. This movement is controlled by the anchor 34 which, driven by the balance pin 28, pivots around its anchor rod 36 in the counter-clockwise direction.

Figure 6:
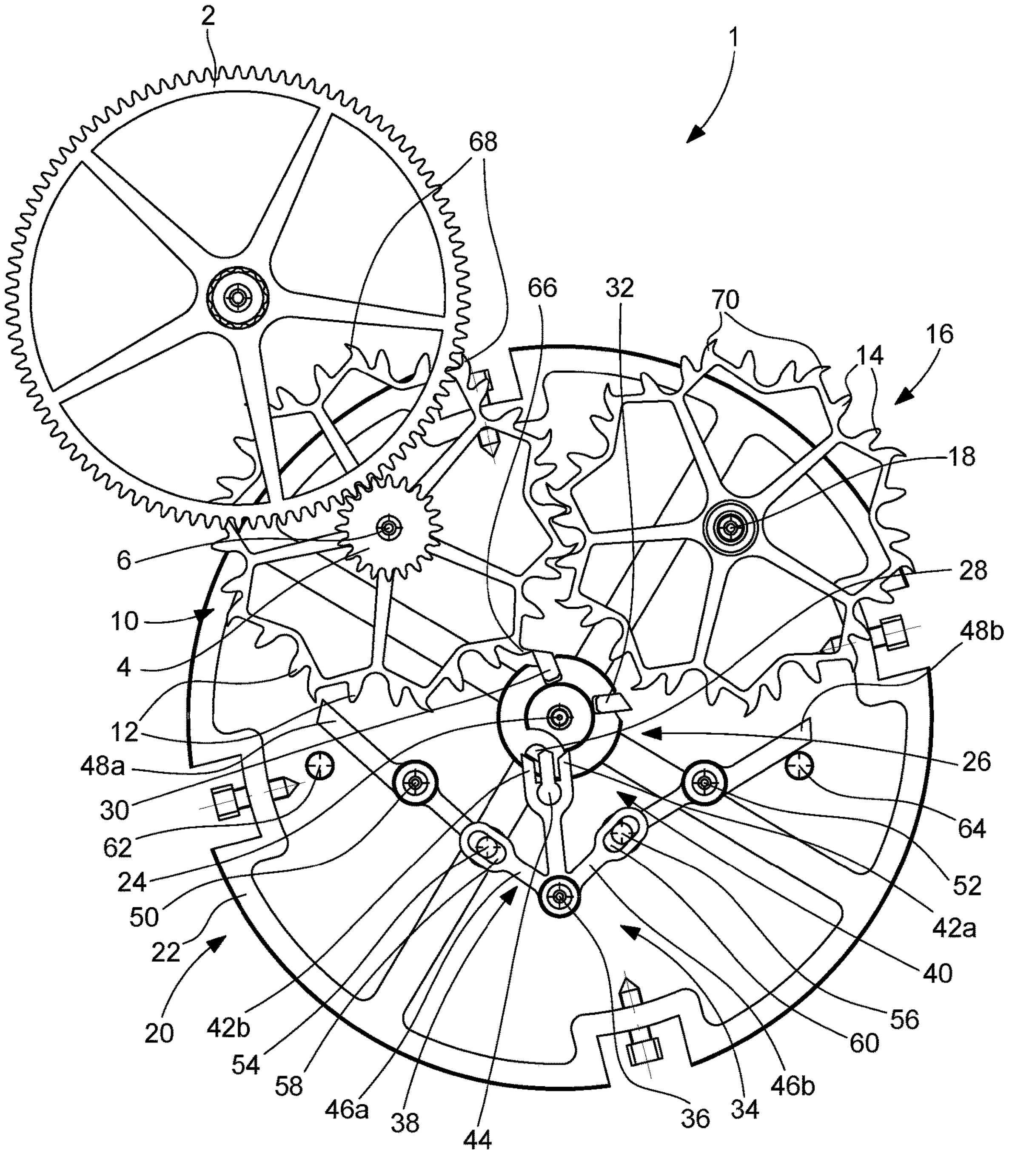
FIG. 6 is a top view of the natural escapement according to the invention in its position wherein the first escapement wheel finishes imparting an impulse to the balance plate, which marks the start of the second drop, while the second lever is bearing on the second limitation abutment.

In FIG. 6, the first escapement wheel 10 finishes imparting an impulse to the balance plate 26, which marks the start of the second drop. It can indeed be seen that the tooth 66 of the first escapement wheel 10 will no longer be in contact with the first impulse pallet 30 of the balance plate 26. Moreover, the second lever 48*b* bears on the second limitation abutment 64.

Figure 7:
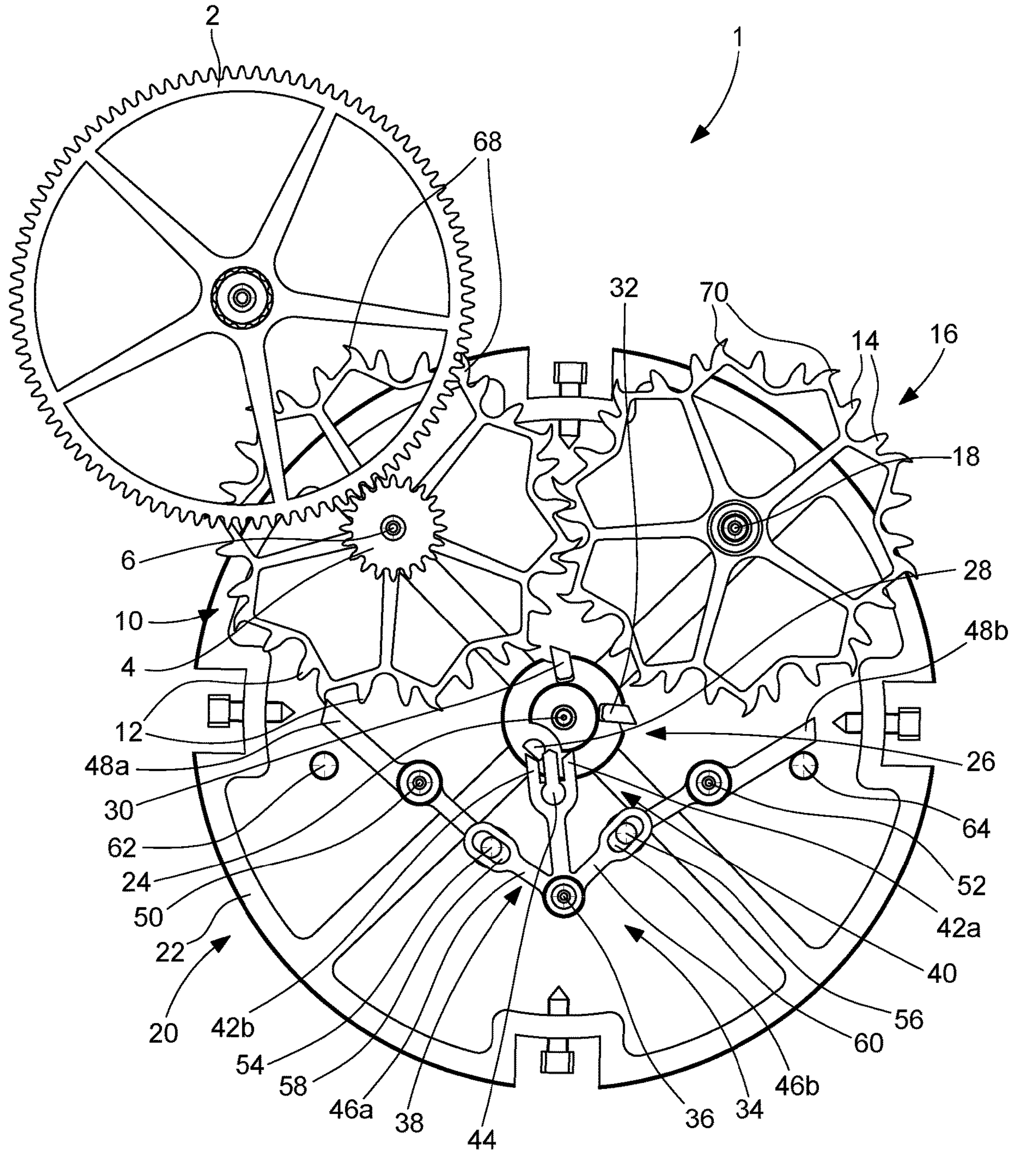
FIG. 7 is a top view of the natural escapement according to the invention in its position wherein the first escapement wheel bears on the first lever, which marks the end of the second drop, while the balance plate ends its alternation freely.

Finally, FIG. 7 is a top view of the natural escapement 1 according to the invention in its other rest position wherein the first escapement wheel 10 bears on the first lever 48*a*, which marks the end of the second drop, while the balance plate 26 ends its alternation freely by rotating in the clockwise direction. The following alternation wherein the balance plate 26 will rotate in the counter-clockwise direction reproduces the same functions as those illustrated in FIGS. 2 to 7 symmetrically in the reverse order.

FIG. 8 schematically illustrates the case where the pivot joints 53 by which the first and second levers 48*a*, 48*b* are connected to the first and second arms 46*a*, 46*b* of the anchor 34 are each formed of a bulge 73 which is engaged into a fork 72.

FIG. 9 schematically illustrates the case where the pivot joints 53 by which the first and second levers 48*a*, 48*b* are connected to the first and second arms 46*a*, 46*b* of the anchor 34 are each formed of a flexible blade 74.

Figure 11:
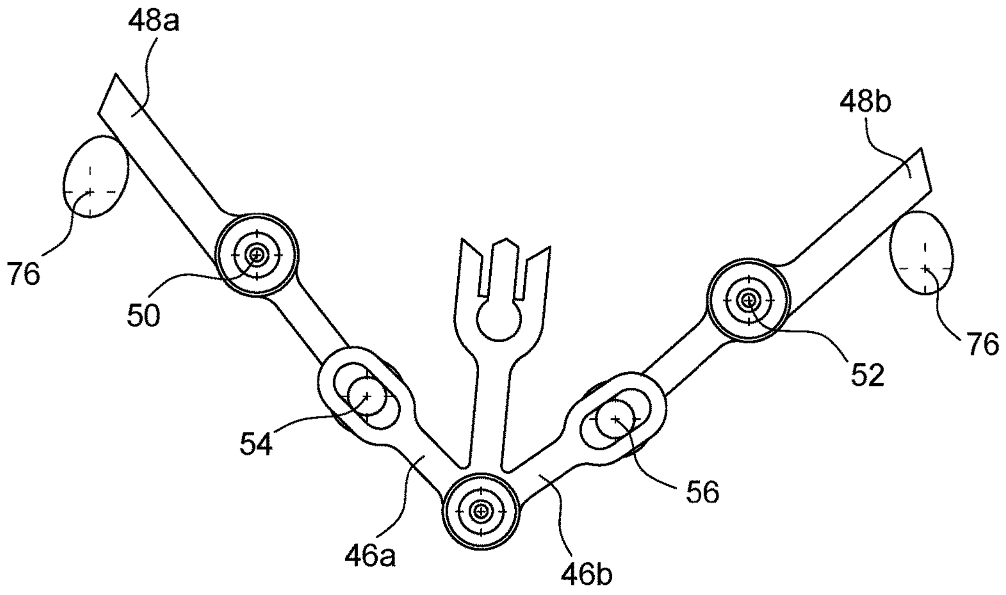
FIG. 11 is a top view which schematically illustrates the case wherein the first and second limitation abutments are eccentrics.

FIG. 11 schematically illustrates the case wherein the first and second limitation abutments 62, 64 are eccentrics 76. The first and second limitation abutments can also be machined in a fixed element such as a platen or a bridge of the horological movement.

Figure 12:
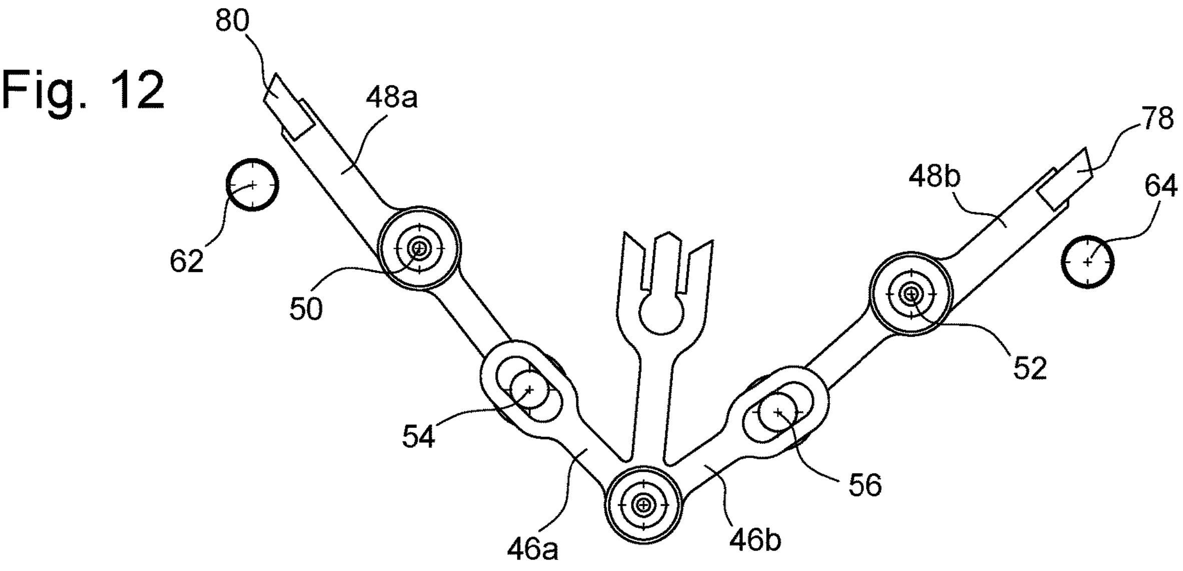
FIG. 12 is a top view which schematically illustrates the case where the levers carry stop pallets.

FIG. 12 schematically illustrates the case where a second stop pallet 78 to temporarily lock the second escapement wheel 16 during the first alternation is attached to the second lever 48*b*, and where a first stop pallet 80 to temporarily lock the first escapement wheel 10 during the second alternation is attached to the first lever 48*a*. These first and second stop pallets 80 and 78 are for example made of ruby.

Figure 13:
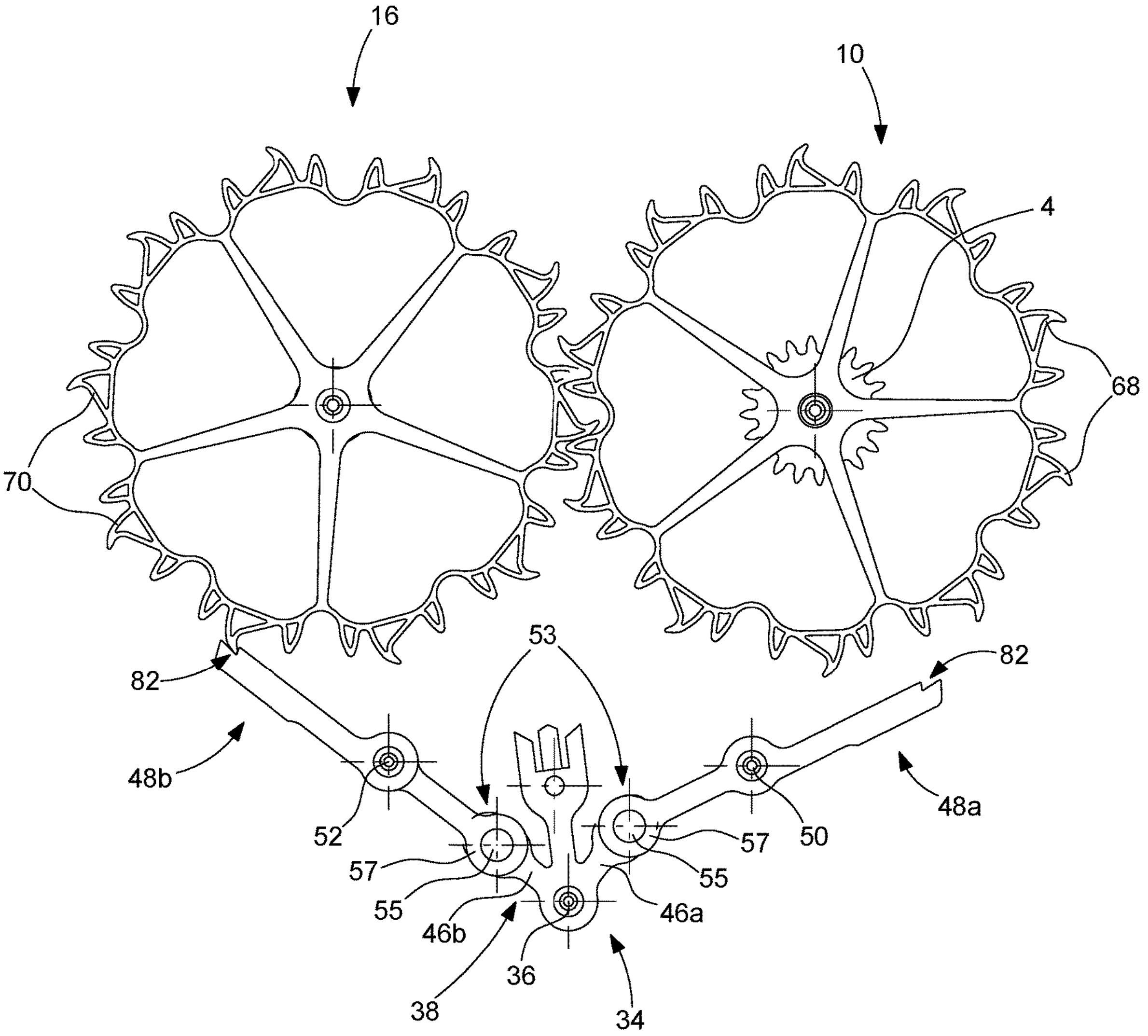
FIG. 13 is a bottom view which illustrates the case wherein the free end of the first and second levers has a recess which allows these first and second levers to perform the limiting abutment function by pressing a tooth of the impulse and rest toothing of the first escapement wheel, respectively of the second escapement wheel, on these recesses.

FIG. 13 illustrates in a bottom view the case wherein the free end of the first and second levers 48*a*, 48*b* has a recess 82 which performs the function of the limitation abutments 62, 64 by a bearing of a tooth of the impulse and rest toothing 68, 70 of the first escapement wheel 10, respectively of the second escapement wheel 16, on these recesses 82. This embodiment thus allows to dispense with the limitation abutments 62, 64 while retaining an operating mode similar to that described above in conjunction with FIGS. 1 and 7. Indeed, when, for example, the second escapement wheel 16 rotates in the counter-clockwise direction and bears on the recess 82 of the second lever 48*b* by one of the teeth of its impulse and rest toothing 70, this second escapement wheel 16 would tend to cause the second lever 48*b* to pivot by pulling around its pivot axis 52 in the clockwise direction in FIG. 13. However, despite the absence of the limitation abutment 62 which therefore cannot oppose the pivoting of the first lever 48*a*, the pivoting of this second lever 48*b* is prevented by pressing one of the teeth of the impulse and rest toothing 70 of the second escapement wheel 16 on the recess 82 formed at the free end of this second lever 48*b*. This bearing opposes the pulling force. The second lever 48*b* escapes its locked position when the anchor 34 pivots in the clockwise direction, which has the effect of pivoting this second lever 48*b* in the counter-clockwise direction, while the first lever 48*a* also pivots in the counter-clockwise direction and approaches the first escapement wheel 10. Note that the first and second levers 48*a*, 48*b*, pivoted about their respective pivot axes 50, 52, are connected to the first and second arms 46*a*, 46*b* of the anchor body 38 via a pivot joint 53 formed of a lug 55 carried by the first and second arms 46*a*, 46*b* of the anchor body 38 in the example shown, and which projects into a corresponding circular opening 57 formed in the first and second levers 48*a*, 48*b*.

Figure 14:
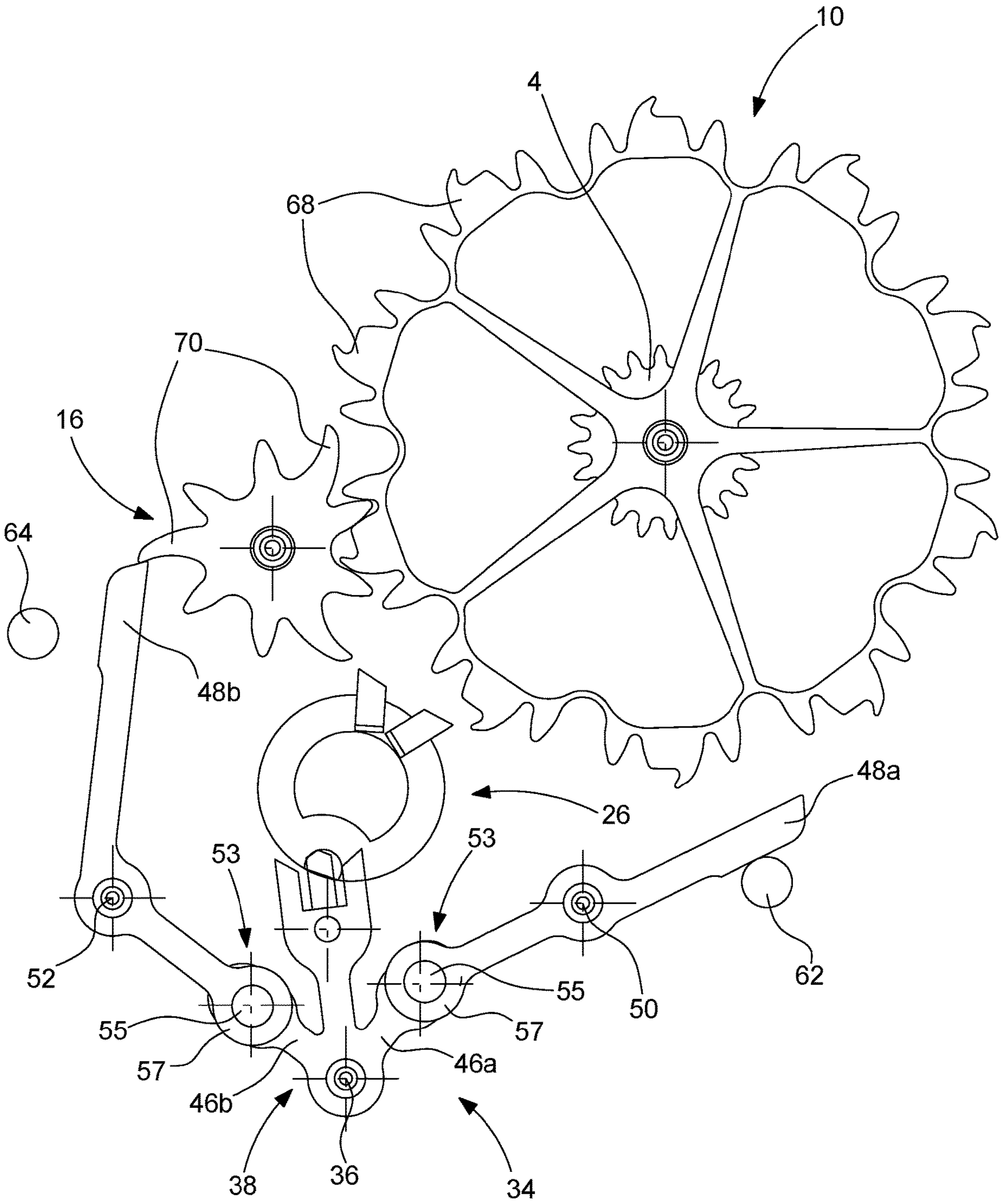
FIG. 14 is a bottom view which illustrates the case wherein the number of teeth of the impulse and rest toothing of the first escapement wheel is equal to 10, and the number of teeth of the impulse and rest toothing of the second escapement wheel is equal to 3.

FIG. 14 illustrates the case wherein the number of teeth of the impulse and rest toothing 68 of the first escapement wheel 10 is equal to 10, and the number of teeth of the impulse and rest toothing 70 of the second escapement wheel 16 is equal to 3. The principles of embodiment of this particular embodiment of the natural escapement 1 according to the invention remain the same: the first and second levers 48*a*, 48*b*, pivoted about their respective pivot axes 50, 52, are connected to the first and second arms 46*a*, 46*b* of the anchor body 38 via a pivot joint 53 formed by a lug 55 carried by the first and second arms 46*a*, 46*b* of the anchor body 38 in the example shown, and which projects into a corresponding circular opening 57 formed in the first and second levers 48*a*, 48*b*.

It goes without saying that the present invention is not limited to the embodiment which has just been described and that various modifications and simple variants can be considered without departing from the scope of the invention as defined by the appended claims. It will be understood in particular that, although the natural escapement 1 according to the invention has been described in connection with an anchor 34 to the arms 46*a*, 46*b* of which are connected first and second levers 48*a*, 48*b*, it is quite possible to consider, in a simplified embodiment of the invention, to provide only one lever pivotally connected to one of the arms of the anchor, the other lever being made in one piece with the second arm of the anchor 34. It will also be noted that a reduction mobile can be disposed between the second wheel 2 and the first escapement wheel 10. The first escapement wheel 10 comprises a first drive toothing 12 through which it meshes with a second drive toothing 14 of the second escapement wheel 16. Likewise, the first and second escapement wheels 10, 16 each comprise an impulse and rest toothing 68, 70 by which they provide a direct and tangential driving impulse to the balance plate 26. The drive 12, 14 and impulse and rest toothing 68, 70 of each of the first and second escapement wheels 10, 16 extending in a single plane or in two parallel planes. Preferably, the first and second escapement wheels 10, 16 are each made in one piece. The number of teeth of the impulse and rest toothing 68 of the first escapement wheel 10 may be different from the number of teeth of the impulse and rest toothing 70 of the second escapement wheel 16. This number can be comprised between 3 and 14, for example equal to 10. In a particular example, the number of teeth of the impulse and rest toothing 68 of the first escapement wheel 10 is equal to 10 and the number of teeth of the impulse and rest toothing 70 of the second escapement wheel 16 is equal to 3. The invention also relates to a horological movement comprising a natural escapement 1 of the type described above.

NOMENCLATURE

1. Natural escapement
2. Second wheel
4. Pinion
6. Axis
10. First escapement wheel
12. First drive toothing
14. Second drive toothing
16. Second escapement wheel
18. Axis
20. Balance
22. Balance wheel
24. Axis
26. Balance plate
28. Balance pin
30. First impulse pallet
32. Second impulse pallet
34. Anchor
36. Anchor rod
38. Anchor body
40. Fork
**42*a***. First horn
**42*b***. Second horn
44. Dart
**46*a***. First arm
**46*b***. Second arm
**48*a***. First lever
**48*b***. Second lever
50. Pivot axis
52. Pivot axis
53. Pivot joints
54. Lug
55. Lug
56. Lug
57. Circular opening
58. Oblong opening
60. Oblong opening
62. First limitation abutment
64. Second limitation abutment
66. Tooth
68. Impulse and rest toothing
70. Impulse and rest toothing
72. Fork
73. Bulges
74. Flexible blade
75. Racks
76. Eccentrics
78. Second stop pallet
80. First stop pallet
82. Recesses

The invention claimed is:

1. A natural escapement for a horological movement performing a succession of operating cycles each composed of a first and a second alternation of a balance, the balance comprises a balance wheel on an axis and a balance plate adjusted about the axis, said natural escapement comprising:

a first escapement wheel arranged to be driven by a second wheel, said first escapement wheel in turn driving a second escapement wheel, the balance plate carrying a balance pin wherein said balance plate causes pivoting of an anchor at each of the first and second alternations; and a first lever, pivoted about a pivot axis, being connected to a first arm of the anchor via at least one pivot joint, the anchor comprising a second arm extended by a second lever, wherein said first and second levers being arranged to respectively lock the first and second escapement wheels temporarily during the second and first alternations of an operating cycle, the pivoting displacement of the first and second levers being limited.

2. The natural escapement according to claim 1, wherein said first and second levers are pivoted about respective pivot axes and are respectively connected to the first and second arms of the anchor via at least one pivot joint.

3. The natural escapement according to claim 1, wherein at least one pivot joint(s) is formed of a lug which projects into an oblong opening.

4. The natural escapement according to claim 2, wherein at least one pivot joint(s) is formed of a lug which projects into an oblong opening.

5. The natural escapement according to claim 1, wherein at least one pivot joint(s) is formed of a bulge which is engaged into a fork.

6. The natural escapement according to claim 2, wherein at least one pivot joint(s) is formed of a bulge which is engaged into a fork.

7. The natural escapement according to claim 1, wherein at least one pivot joint(s) is formed of a flexible blade.

8. The natural escapement according to claim 2, wherein at least one pivot joint(s) is formed of a flexible blade.

9. The natural escapement according to claim 1, wherein at least one pivot joint(s) is formed of two geartrain portions each of which constitutes a rack.

10. The natural escapement according to claim 2, wherein at least one pivot joint(s) is formed of two geartrain portions each of which constitutes a rack.

11. The natural escapement according to claim 1, wherein the pivoting displacement of the first and second levers is limited by first and second limitation abutments.

12. The natural escapement according to claim 11, wherein the first and second limitation abutments are pegs.

13. The natural escapement according to claim 11, wherein the first and second limitation abutments are machined in a fixed element of the horological movement.

14. The natural escapement according to claim 11, wherein the first and second limitation abutments are eccentrics.

15. The natural escapement according to claim 1, wherein the first lever is made in one piece and has a geometry which performs the function of a first stop pallet to temporarily lock the first escapement wheel during the second alternation, and the second lever is made in one piece and has a geometry which performs the function of a second stop pallet to temporarily lock the second escapement wheel during the first alternation.

16. The natural escapement according to claim 1, wherein the first lever comprises a first stop pallet attached to temporarily lock the first escapement wheel during the second alternation, and the second lever includes a second stop pallet attached to temporarily lock the second escapement wheel during the first alternation.

17. The natural escapement according to claim 1, wherein the balance plate carries a first and a second impulse pallet through which said balance plate receives a direct and tangential driving impulse respectively from the first escapement wheel and the second escapement wheel.

18. The natural escapement according to claim 1, wherein the first escapement wheel comprises a first drive toothing through which it meshes with a second drive toothing of the second escapement wheel, and wherein the first and second escapement wheels each comprise an impulse and rest toothing wherein they provide a direct and tangential driving impulse to the balance plate, the drive and impulse and rest toothing of each of the first and second escapement wheels extending in a single plane or in two parallel planes.

19. The natural escapement according to claim 18, wherein the first and second escapement wheels are each made in one piece.

20. The natural escapement according to claim 18, wherein the number of teeth of the impulse and rest toothing of the first escapement wheel is different from the number of teeth of the impulse and rest toothing of the second escapement wheel.

21. The natural escapement according to claim 19, wherein the number of teeth of the impulse and rest toothing of the first escapement wheel is different from the number of teeth of the impulse and rest toothing of the second escapement wheel.

22. The natural escapement according to claim 18, wherein the number of teeth of the impulse and rest toothing of the first and second escapement wheels is comprised between 3 and 14.

23. The natural escapement according to claim 22, wherein the number of teeth of the impulse and rest toothing of the first and second escapement wheels is equal to 10.

24. The natural escapement according to claim 22, wherein the number of teeth of the impulse and rest toothing of the first escapement wheel is equal to 3, and the number of teeth of the impulse and rest toothing of the second escapement wheel is equal to 10.

25. The natural escapement according to claim 24, wherein the number of teeth of the impulse and rest toothing of the first escapement wheel is equal to 10, and the number of teeth of the impulse and rest toothing of the second escapement wheel is equal to 3.

26. The natural escapement according to claim 18, wherein a free end of the first and second levers has a recess which allows to limit the pivoting displacement of these first and second levers by pressing a tooth of the impulse and rest toothing of the first escapement wheel, respectively of the second escapement wheel, on these recesses.

27. The natural escapement according to claim 1, wherein the anchor comprises a fork formed of a first and a second horn, the balance plate abutting by its balance pin against the second horn of the fork and causing the pivoting of said anchor in a first direction during the first alternation, and against the first horn during the second alternation, causing the anchor to pivot in a second direction opposite to the first direction.

28. The natural escapement according to claim 27, wherein the fork carries a dart which cooperates with the balance plate to prevent accidental displacements of the fork during a period called additional arc.

29. The natural escapement according to claim 1, further comprising a reduction mobile arranged to be disposed between the second wheel and the first escapement wheel.

* * * * *